United States Patent [19]

Widl et al.

[11] Patent Number: 5,463,373
[45] Date of Patent: Oct. 31, 1995

[54] DEVICE FOR VERIFYING DISTURBANCES IN SIGNAL TRANSMISSION IN MOTOR VEHICLES

[75] Inventors: Gerhard Widl, Grafelfing-Lochhamm; Manfred Fichter, Königsfeld, both of Germany

[73] Assignee: Mannesmann Kienzle GmbH, VS-Villingen, Germany

[21] Appl. No.: 8,916

[22] Filed: Jan. 26, 1993

[30] Foreign Application Priority Data

Jan. 30, 1992 [DE] Germany .......................... 42 02 583.4

[51] Int. Cl.⁶ ...................................................... B60Q 1/00
[52] U.S. Cl. ........................... 340/441; 324/161; 340/466
[58] Field of Search ..................... 340/466, 441, 340/439, 444, 434; 364/424.01, 424.03, 424.04, 426.02, 426.03, 426.04, 431.07, 565; 377/28; 324/161, 172, 166

[56] References Cited

U.S. PATENT DOCUMENTS 4,086,563  4/1978  Bachman .......................... 324/172
4,188,618  2/1980  Weisbart .......................... 364/424.04
4,419,654  12/1983  Funk .................................. 324/161
4,644,368  2/1987  Mutz .................................. 340/439
5,136,516  8/1992  Twombly ........................ 364/426.05

*Primary Examiner*—Brent Swarthout
*Attorney, Agent, or Firm*—Anderson Kill Olick & Oshinsky

[57] ABSTRACT

A device is disclosed which can detect and document tampering in the signal transmission path between speed measurement and/or mileage counting devices and the speed transmitters which are associated with these devices using the simplest possible means and so as to be suitable for large-scale series manufacture. The device provides that at least one movement transmitter, which senses forces which are typical of driving, is arranged inside the respective measurement device, and that an evaluating circuit is also provided, which delivers a signal which controls a recording arrangement when signals of a speed transmitter do not correspond with those of the movement transmitter.

2 Claims, 3 Drawing Sheets

5,463,373

DEVICE FOR VERIFYING DISTURBANCES IN SIGNAL TRANSMISSION IN MOTOR VEHICLES

FIELD OF THE INVENTION

The present invention pertains to a device for verifying disturbances in signal transmission in motor vehicles, and in particular, the signal transmission which occurs between speedometers and/or mileage counters and speed (rate of rotation) transmitters which are arranged external to these devices and are accompanied by the use of a recording arrangement.

BACKGROUND OF THE INVENTION

It is well known that the data which is determined and recorded by tachographs and the like devices, which are installed in motor vehicles, is valuable insofar as it serves to clarify traffic accidents, to determine the type and extent of the use of a vehicle, and to verify the work times and the rest periods for the driver who is employing the vehicle. This necessarily entails the risk that the recordings of these devices may be altered for fraudulent purposes or that attempts may be made to prevent these recordings. On the other hand, there is also the problem of verifying that the power supply of the respective devices, or the associated signal transmission, may have been tampered with. There are many opportunities for tampering, especially since the speed transmitter is externally situated and is connected with the respective devices via electrical lines and plug-in connections.

In order to verify interruptions in the operating voltage, which result in a compression of the driving time, and which may be effected, for instance, by means of a flasher or a windshield wiper interval timer, so as not to be recognized immediately as tampering, it is known to provide a storage circuit, which records a mark, which is atypical of driving, e.g. a radial line over the entire speed recording field in conventional tachographs, when the operating voltage is switched on again.

Further, it is also known to effect the signal transmission twice and to transmit an inverted signal sequence of one and the same speed transmitter via a second signal line. An Exclusive OR gate, located on the device side, serves as an evaluating or recognition circuit which, in the case of a tachograph recording on diagram charts, controls the speed recording member during a disruption in the signal transmission, in such a manner, that it is deflected in a defined manner and records a bar chart if the disturbance persists.

This known device may verify whether or not the speed transmitter is completely severed, whether one of the transmitter lines is interrupted or short-circuited with other lines, or whether the power supply of the transmitter is interrupted. To this extent, this device also offers a relatively reliable self-monitoring of the speed transmitter, including the signal lines and contacts.

In spite of the above, however, there are known methods of tampering with these devices which cannot be detected by the devices described above since they meet the conditions of phase inversion. In other words, they simulate an orderly operation of transmitter and signal transmission. In this manner, the work time codes which are applicable to commercial transportation, and which are often ignored in this highly competitive branch of industry, may be circumvented. In particular, adherence to prescribed rest periods may be falsified or, in the case of taxis or rental cars, illegal trips may be made without any mileage record. Another known practice is the simulation of a speed chart, which makes it possible to exceed legally prescribed speed limits without detection.

SUMMARY OF THE INVENTION

The present invention provides a device for verifying disturbances in signal transmission in motor vehicles which overcomes the shortcomings in the prior art. The object of the present invention is therefore to detect previously undetectable disruptions in the signal transmission and signals which do not correspond to the driving record while employing means which are as simple as possible and which are suited for large-scale series production.

The device of the present invention provides that at least one movement transmitter, which senses forces which are typical of driving, is arranged inside a respective measurement device and that an evaluating circuit is provided, which delivers a disturbance signal which controls a recording arrangement when signals of the speed transmitter do not correspond with those of the movement transmitter.

A preferred embodiment which specifically relates to tampering is characterized in that, in order to verify the disruption of signals from the speed transmitter, the evaluating circuit delivers a disturbance signal when a pulse of the movement transmitter, which is stored in the evaluating circuit, is not canceled by a pulse of the speed transmitter after a determined period of time has elapsed.

The evaluating circuit of this embodiment contains a flip-flop stage, the set input of which is associated with the movement transmitter and the reset input of which is connected with the signal input of the speed transmitter on the device side. A timer is also provided which is controllable by the pulses of the movement transmitter and the output of which is linked with the output of the flip-flop stage via an AND operation.

The solution which is proposed by the present invention provides the advantage that previous measures for verifying disruption may be dispensed with and that only one signal line may be required for the speed transmitter. The disruption of signals from the speed transmitter may be adequately detected by an evaluating circuit, which is of a simple construction, and one or more movement or acceleration transmitters, which may be of relatively simple construction and which, in order to filter out engine vibrations, shaking when loading and unloading, or vibrations which may be caused by getting into and out of the vehicle, are designed for detecting longitudinal and/or transverse accelerations, which are in turn, typical of driving and which further operate substantially in any one of the possible installation positions in the respective motor vehicle devices.

If the respective motor vehicle device is outfitted with a microprocessor, the evaluating program may be carried out with the microprocessor and a recording may either be written into a data storage device, which may also be available, and/or made in legible form such as, for example, on the diagram chart of a tachograph. If a buffer battery is provided, which may exist in certain devices, such as, for example, in fare calculators, the verification of the disruption or tampering may also be ensured in the event of disruptions of power at least with an electronic recording. Moreover, the electronic recording is suitable particularly for mileage counters which are provided for the mileage-dependent taxation of motor vehicles insofar as wheel revolution counters, which may be arranged on the wheel hub of the vehicle, may not be utilized for this purpose. This practically rules out tampering.

Accordingly, it is an object of the present invention to provide a device for verifying disturbances in signal transmission in motor vehicles which detects previously undetectable disruptions in the signal transmission and signals which do not correspond to the driving record while employing means which are as simple as possible and which are suitable for large-scale series production.

It is another object of the present invention to provide a device for verifying disturbances in signal transmission in motor vehicles which provides that at least one movement transmitter, which senses forces which are typical of driving, is arranged inside the respective measurement device and that an evaluating circuit is provided, which delivers a disturbance signal which controls the recording arrangement when signals of the speed transmitter do not correspond with those of the movement transmitter.

It is another object of the present invention to provide a device for verifying disturbances in signal transmission in motor vehicles which provides for the advantage that previous measures for verifying disruptions may be dispensed with and that only one signal line may be required for the speed transmitter.

It is yet another object of the present invention to provide for a device for verifying the disturbances in signal transmission in motor vehicles so as to practically rule out tampering.

Other objects and advantages of the present invention will be made apparent to those persons skilled in the art upon a review of the Description of the Preferred Embodiment taken in conjunction with the drawings which follow.

DESCRIPTION OF THE PREFERRED EMBODIMENT

Figure 1:
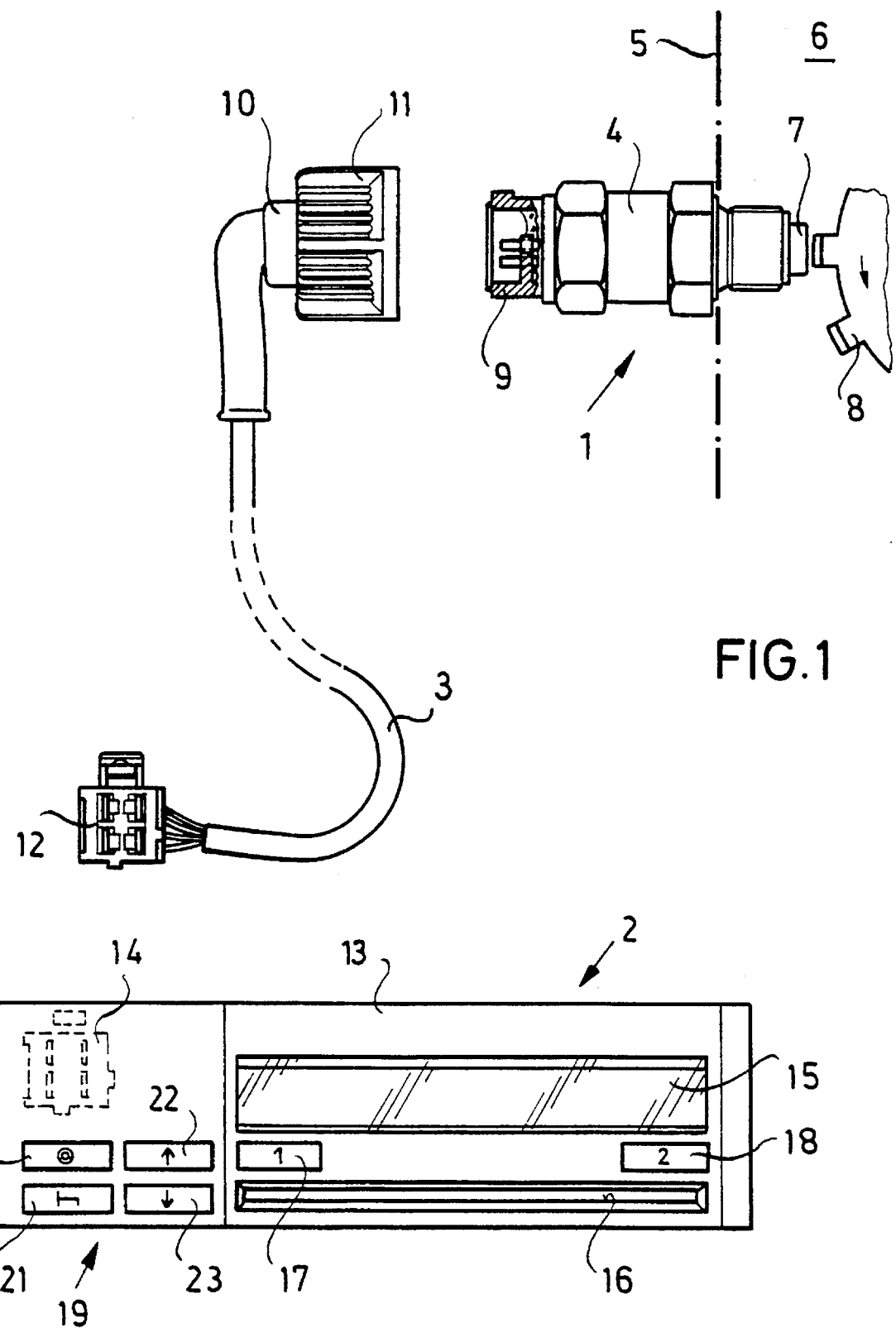
FIG. 1 illustrates an overview of the signal transmission situation between a speed transmitter and a tachograph.

FIG. 1 illustrates an overview of a signal transmission situation between a speed transmitter and a tachograph. The overview in FIG. 1 illustrates that the speed transmitter 1 is arranged so as to be spatially separate from the device, which is in this instance, a tachograph 2 which counts and/or records the detected speed values and is connected with the latter via a cable 3. The transmitter housing 4, which is generally sleeve-shaped, is flanged on a wall 5 of the transmission casing of the motor vehicle in a conventional manner. The measuring head 7 of the speed transmitter 1, which projects into the transmission space 6, cooperates with a ferromagnetic clock wheel 8, which is provided on the transmission side, while a connector cap 9, is arranged at the opposite side of the transmitter housing 4.

A plug-in connector 10, which is formed on one end of the cable 3, may be connected with the connector cap 9 by means of a union nut 11 which is sealed. A plug-in connector 12 is provided at the opposite end of the cable 3 and may be connected, in a locking-manner, into a suitable connector socket 14 which is constructed at the rear wall of the housing 13 of the tachograph 2. This plug-in connection must also be sealed.

The arrangement shown in FIG. 1, however, illustrates that devices, which are arranged in or around the dashboard, are generally weak points which invite tampering, especially since plated cables may not be utilized because of cost reasons. Since these weak points are located in areas of the motor vehicle which are not easily accessible, more subtle and brief tampering may not be easily detected, at least not by random control measures, such as by traffic control.

For the sake of completeness, the tachograph 2 of FIG. 1 is described in more detail below. Referring once again to FIG. 1, the tachograph 2 includes a display 15, a slot 16, keys 17 and 18, which are assigned to the driver and which automatically record the driving time of the respective driver when actuated, and a keyboard 19, all of which elements are visible on the front of the tachograph 2 of FIG. 1. Diagram charts, which serve as recording media, may be inserted or removed via the slot 16, or a printed document, which contains driving and work time data, may be fed out of the tachograph 2 if such a design is desired. Keys 20 and 21 of the keyboard 19 serve to switch on the driving times and the rest periods, respectively, of the respective driver, on the display 15. Keys 22 and 23 control the insertion and the removal of a diagram chart.

Figure 2:
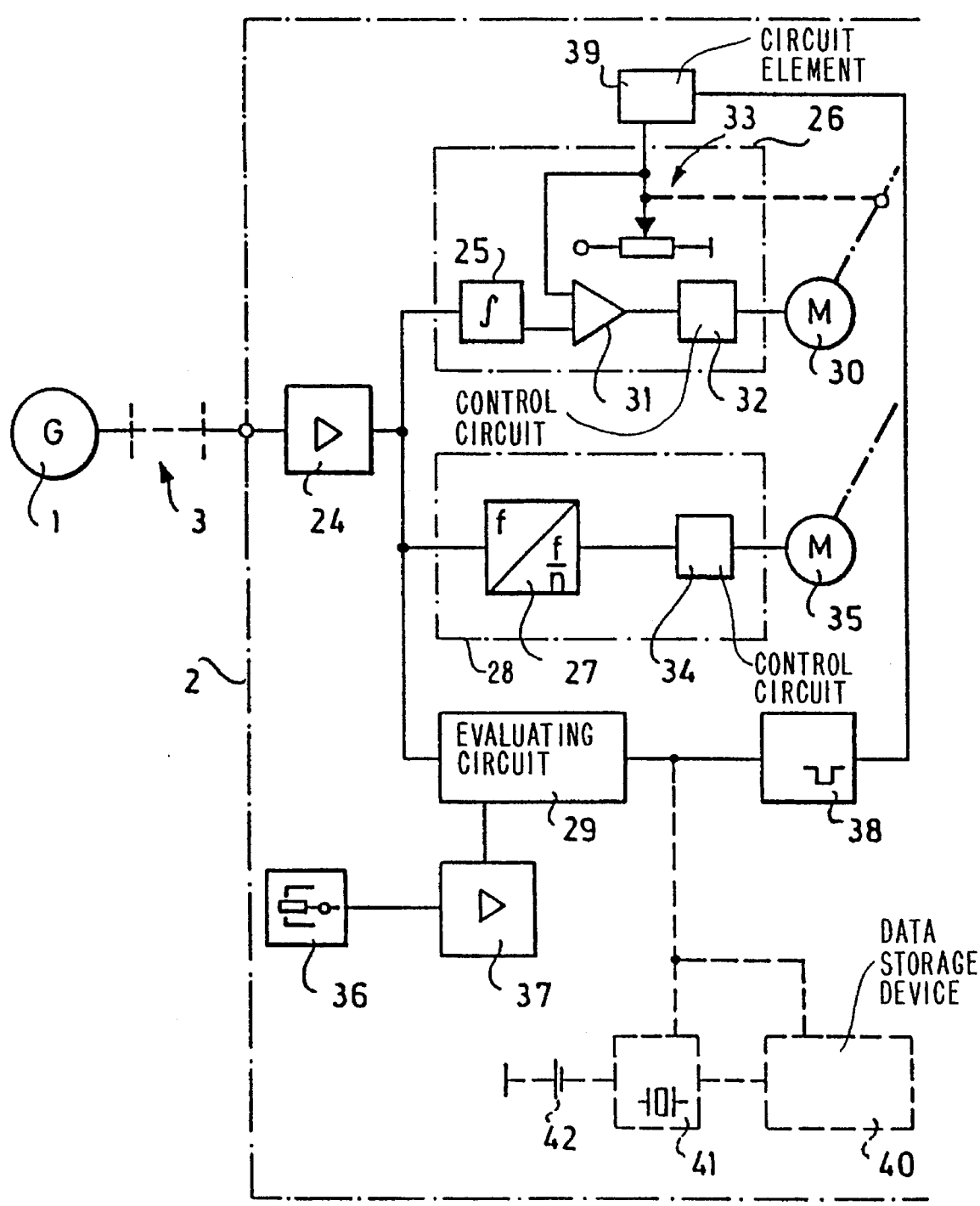
FIG. 2 illustrates a block wiring diagram of an electronic tachograph with analog measurement value processing along with a device which is the subject of the present invention.

As can be seen from FIG. 2, the transmitter 1, which may be a magnetic field transmitter, supplies a determined pulse count/mileage unit to at least one signal line of the cable 3 by tapping the transmission of the vehicle. The cable 3 may have a second signal line and, in addition, may contain lines for the power supply of the transmitter. These pulses, the frequency of which changes with the driving speed, are shaped in a determined pulse duration and are amplified by a pulse shaper 24 which is located in the tachograph 2 and which is available simultaneously at the frequency-voltage transformer 25 of a speed measurement circuit 26, at the frequency transformer 27 of a mileage counter circuit 28, and at an evaluating circuit 29.

The speed measurement circuit 26 is typically a control amplifier which triggers a servomotor 30 with a speed-proportional d.c. signal. The servomotor 30, in turn, serves to follow-up the speed recording means and the adjustment of the display means in the event that the respective tachograph is outfitted with an indicator display. A comparison circuit of the control amplifier is designated by the reference numeral 31, while a control circuit, which is associated with the servomotor 30, is designated by the reference numeral 32. A potentiometer 33 transforms the actual value of the position of the servomotor 30, which is to be fed back to the comparison circuit 31, into a d.c. voltage. A stepping motor 35, which drives a mileage counter (not shown), and a mileage recording member of the tachograph 2, is controlled by the control circuit 34 of the mileage counting circuit 28.

The evaluating circuit 29 is connected with both the speed transmitter 1 and the movement transmitter 36, the signals of which are preferably signals which are based upon the longitudinal and/or the transverse accelerations of the vehicle, and which are transformed into pulses of a defined duration in a shaping and amplifying circuit 37 so as to suppress overshooting or bouncing of the movement transmitter 36. As is also shown in FIG. 2, a mono-flop 38 is controlled by the output signal of the evaluating circuit 29 which may be a disruption pulse. The mono-flop 38 supplies a voltage to the comparison circuit 31 via a circuit element 39 by the parallel connection of a resistance to the potentiometer 33, the voltage of which corresponds to the recording stroke which is provided for recording the disturbance and, accordingly, to the rotational angle of the servomotor 30 which is required for this purpose. In this manner, the disturbance is recorded by the speed recording member.

An additional recording member, which is provided only for recording disruptions, may also be triggered. An exclusive or an additional storage of the disturbance is also envisioned, wherein real-time data entries, which are supplied by a timer 41, may be written into a data storage device 40 in order to characterize the disturbance. An accumulator 42 serves as a buffer for the detection of an electronic disturbance.

Figure 3:
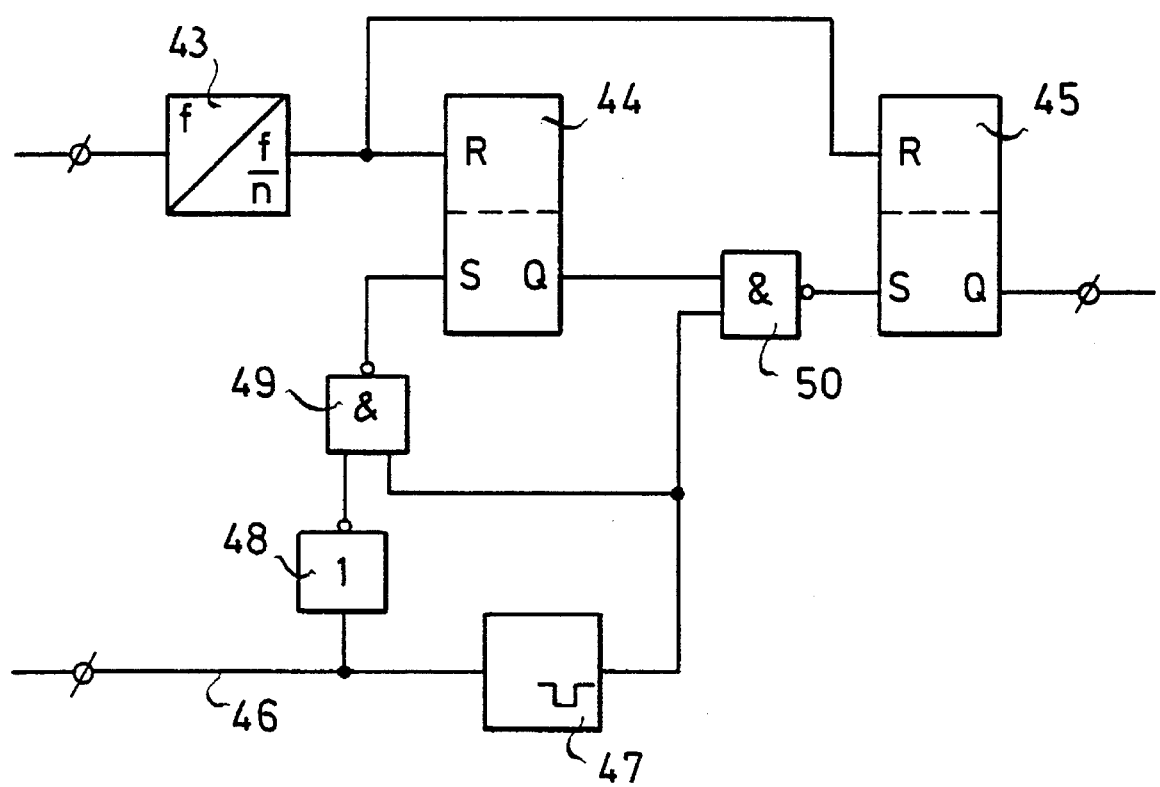
FIG. 3 illustrates a wiring diagram of the evaluating device which is depicted as a block in FIG. 2.

Further details of the evaluating circuit 29 are illustrated in FIG. 3. In FIG. 3, a frequency transformer 43, which is provided at the input side, is connected with the reset inputs of two flip-flop stages 44 and 45. The flip-flop stage 44 serves to store a pulse of the movement transmitter 36, which occurs on the line 46, while the flip-flop stage 45 serves to suppress the first disturbance pulse, which is advantageous, particularly in the event of sudden stops which may be due to traffic conditions when the movement transmitter 36 is not sufficiently cushioned. When a pulse of the movement transmitter occurs on the line 46, a mono-flop 47 is activated and sets the flip-flop 44, via the NOT circuit 48 and the NAND gate 49. When the frequency transformer 43 delivers a transmitter pulse within the time period, which is predetermined by the mono-flop 47, and which, for example, is typically 8 seconds, the flip-flop 44 is reset. For example, when the potential changes at the mono-flop 47, upon the expiration of the switching time, the AND condition is no longer met for the NAND gate 50, which is located at the output of the evaluating circuit 29, and the output of a disturbance signal is prevented. Conversely, a disturbance signal is supplied by the evaluating circuit 29 when a resetting of the flip-flop 44 is not effected within the switching time of the mono-flop 47 and the flip-flop 45 is already set by a previous cycle.

For the sake of completeness, it is also noted that, when a disturbance is recorded on a diagram chart, the pause between the two disturbance signals, which result from the mono-flop 47, in connection with the flip-flop 45, enables a sufficiently dense bar recording and prevents the risk of writing through. This also helps to keep the power consumption and the stress on the recording system as low as possible.

While the present invention has been described in a preferred embodiment, such description is merely illustrative of the present invention and is not meant to be a limitation thereof. In this regard, the present invention encompasses all modifications, variations and/or alternate embodiments with the scope of the present invention being limited only by the claims which follow.

What is claimed is:

1. A device for verifying disturbances in signal transmission in motor vehicles, particularly the signal transmission between speed measurement and/or mileage counter devices and speed transmitters which are arranged external to said devices, which comprises:

a speed transmitter;

at least one movement transmitter;

a recording arrangement;

a measurement device associated with said at least one movement transmitter; and an evaluating circuit, wherein said at least one movement transmitter senses forces which are typical of driving, and further wherein said at least one movement transmitter is arranged inside said measurement device associated therewith, and further wherein said evaluating circuit supplies a disturbance signal which controls said recording arrangement when signals of said speed transmitter do not correspond with signals of said movement transmitter, wherein said evaluating circuit supplies a disturbance signal when a pulse of said at least one movement transmitter, which is stored in said evaluating circuit, is not canceled by a pulse of said speed transmitter after a determined period of time so as to verify a disruption of signals from said speed transmitter, wherein said evalating circuit further comprises:

a flip-flop stage the set input of which is associated with said at least one movement transmitter and the reset input of which is connected with a signal input of said speed transmitter, wherein a timer is provided which is controllable by pulses of said movement transmitter, and further wherein an output of said movement transmitter is linked with an output of said flip-flop stage via an AND operation, wherein said device further comprises:

a frequency transformer, wherein said frequency transformer is connected to said reset input of said flip-flop stage, and further wherein said frequency transformer has a pitch ratio such that pulse pauses associated therewith are shorter than a switching period of said timer at an output of said frequency transformer at a low driving speed.

2. A device for verifying disturbances in signal transmission in motor vehicles, particularly the signal transmission between speed measurement and/or mileage counter devices and speed transmitters which are arranged external to said devices, which comprises:

a speed transmitter;

at least one movement transmitter;

a recording arrangement;

a measurement device associated with said at least one movement transmitter; and an evaluating circuit, wherein said at least one movement transmitter senses forces which are typical of driving and further wherein said at least one movement transmitter is arranged inside said measurement device associated therewith, and further wherein said evaluating circuit supplies a disturbance signal which controls said recording arrangement when signals of said speed transmitter do not correspond with signals of said movement transmitter, wherein said evaluating circuit determines, with the aid of signals from said speed transmitter and said at least one movement transmitter, whether a change in speed of said vehicle was effected at least one of during and after an acceleration phase in order to verify a simulated speed profile.

\* \* \* \* \*